United States Patent [19]

Takahashi et al.

[11] Patent Number: 5,702,123
[45] Date of Patent: Dec. 30, 1997

[54] AIR BAG APPARATUS FOR PASSENGER SEAT

[75] Inventors: Hiroyuki Takahashi; Makoto Hamada; Hiromichi Fujishima; Masaaki Naito, all of Aichi-ken; Kazuya Sasaki; Jiro Tsuchiya, both of Shizuoka-ken; Tomoharu Maeda, Aichi-ken, all of Japan

[73] Assignee: Toyota Jidosha Kabushiki Kaisha, Toyota, Japan

[21] Appl. No.: 613,378

[22] Filed: Mar. 7, 1996

[30] Foreign Application Priority Data

Mar. 31, 1995 [JP] Japan .................. 7-076135

[51] Int. Cl.⁶ .................................................. B60R 21/32
[52] U.S. Cl. .................................................... 280/735
[58] Field of Search ........................................ 280/735

[56] References Cited

U.S. PATENT DOCUMENTS

| | | | |
|---|---|---|---|
| 4,886,295 | 12/1989 | Browne | 280/777 |
| 5,071,160 | 12/1991 | White et al. | 280/735 |
| 5,118,134 | 6/1992 | Mattes et al. | 280/735 |
| 5,161,820 | 11/1992 | Vollmer | 280/730.1 |
| 5,232,243 | 8/1993 | Blackburn et al. | 280/732 |
| 5,330,226 | 7/1994 | Gentry et al. | 280/735 |
| 5,366,241 | 11/1994 | Kithil | 280/735 |
| 5,398,185 | 3/1995 | Omura | 280/735 |
| 5,413,378 | 5/1995 | Steffens, Jr. et al. | 280/735 |
| 5,528,698 | 6/1996 | Kamei et al. | 280/735 |
| 5,531,472 | 7/1996 | Semchena et al. | 280/735 |

FOREIGN PATENT DOCUMENTS

| | | |
|---|---|---|
| 473324 | 3/1992 | European Pat. Off. . |
| 4341500 | 6/1994 | Germany . |
| 1-130857 | 9/1989 | Japan . |
| 2-147357 | 12/1990 | Japan . |
| 2-293234 | 12/1990 | Japan . |
| 3-248946 | 11/1991 | Japan . |
| 6-1012 | 1/1994 | Japan . |
| 6-24286 | 2/1994 | Japan . |
| 94/22693 | 10/1994 | WIPO . |

OTHER PUBLICATIONS

Automotive Engineering, "Child-seat and occupant-presence detection" vol. 102, 1994 May, No. 5.

Primary Examiner—Kenneth R. Rice
Attorney, Agent, or Firm—Cushman, Darby & Cushman IP Group of Pillsbury, Madison & Sutro LLP

[57] ABSTRACT

An air bag apparatus for a passenger seat includes: a first sensor for detecting an occupant seated in a passenger seat; a second sensor for detecting a state in which the occupant is approaching an instrument panel excluding a state in which the occupant put out his or her hand(s) on the instrument panel; and a deployment controller for changing the control of deployment of an air bag when the occupant is detected by the first sensor and the state in which the occupant is approaching the instrument panel is detected by the second sensor.

22 Claims, 13 Drawing Sheets

AIR BAG APPARATUS FOR PASSENGER SEAT

BACKGROUND OF THE INVENTION

1. Field of the Invention

The present invention relates to an air bag system for a passenger seat, and more particularly to an air bag system for a passenger seat for controlling the deployment of an air bag in correspondence with the state of an occupant in the passenger seat.

2. Description of the Related Art

Conventionally, vehicles are known which are equipped with an air bag apparatus for a passenger seat for protecting an occupant seated in the passenger seat during an emergency of the vehicle, and one example thereof is disclosed in U.S. Pat. No. 5,330,226.

As shown in FIG. 13, this air bag apparatus for a passenger seat is provided with a displacement sensor 76 mounted in an instrument panel 74 for detecting the distance between the position of accommodation of an air bag 70 and an occupant 72, as well as an infrared sensor 78 mounted on a ceiling portion above the head of the occupant 72 and having a plurality of viewing fields. These sensors provide outputs corresponding to the location of the occupant 72 relative to the position of accommodation of the air bag 70 to a controller 80. When at least one of the signals from these sensors indicates that the occupant 72 is at least a predetermined distance away from the position of accommodation of the air bag 70, the controller 80 sends an enable signal to an occupant restraint system 82 to set the occupant restraint system 82 in an operative state in which the air bag 70 is inflatable. On the other hand, when one of the signals from these sensors indicates that the occupant 72 is not at least the predetermined distance away from the position of accommodation of the air bag 70, the air bag 70 is not inflated.

However, with such an air bag apparatus for a passenger seat, in the event that the vehicle has decelerated due to hard braking or the like, and the occupant 72 has instantaneously put out his or her hands on the instrument panel 74 to protect his or her body, there are cases where the deployment of the air bag 70 is controlled upon determining that the occupant 72 is not at least a predetermined distance away from the position of accommodation of the air bag 70 although the body of the occupant 72 is not very close to the position of accommodation of the air bag 70.

SUMMARY OF THE INVENTION

In view of the above-described circumstances, it is an object of the present invention to provide an air bag apparatus for a passenger seat which is capable of deploying the air bag positively in a condition for which the deployment of the air bag is desired.

To this end, in accordance with a first aspect of the present invention, there is provided an air bag apparatus for a passenger seat, comprising: a first sensor for detecting an occupant seated in a passenger seat; a second sensor for detecting a state in which the occupant is approaching an instrument panel excluding a state in which the occupant puts out his or her hand(s) on the instrument panel; and a deployment controller for changing the control of deployment of an air bag when the occupant is detected by the first sensor and the state in which the occupant is approaching the instrument panel is detected by the second sensor.

In accordance with a second aspect of the present invention, in the air bag apparatus for a passenger seat according the first aspect, the first sensor is an ultrasonic sensor which is disposed at a vehicle compartment-side position in a vicinity of a connecting portion between a roof and a windshield of a vehicle and at a position on a passenger seat side, a detecting region of the first sensor being oriented downward and including a position of leg portions of the occupant in a seated state.

In accordance with a third aspect of the present invention, in the air bag apparatus for a passenger seat according to the first aspect, the second sensor is an ultrasonic sensor which is disposed at the vehicle compartment-side position in the vicinity of the connecting portion between the roof and the windshield of the vehicle and at the position on the passenger seat side, a detecting region of the second sensor being oriented toward the instrument panel and including a position spaced apart a predetermined distance upwardly from the instrument panel.

In accordance with a fourth aspect of the present invention, in the air bag apparatus for a passenger seat according to the second aspect, the second sensor is an ultrasonic sensor which is disposed at a vehicle compartment-side position in a vicinity of a connecting portion between a roof and a windshield of a vehicle and at a position on a passenger seat side, a detecting region of the second sensor being oriented toward the instrument panel and including a position spaced apart a predetermined distance upwardly from the instrument panel. Further, the apparatus comprises a third sensor disposed between the first sensor and the second sensor and constituted by an ultrasonic sensor, a detecting region of the third sensor being oriented toward a space between the instrument panel and a seat cushion and including a position below the instrument panel.

In accordance with a fifth aspect of the present invention, in the air bag apparatus for a passenger seat according to the first aspect, the second sensor is an ultrasonic sensor which is disposed on the instrument panel such that a detecting region of the second sensor is oriented in a rearward direction of the vehicle, a lower end of the detecting region including a position spaced apart a predetermined distance upwardly from the instrument panel.

In accordance with a sixth aspect of the present invention, in the air bag apparatus for a passenger seat according to the first aspect, the second sensor is an ultrasonic sensor which is disposed in the instrument panel such that a detecting region of the second sensor is oriented toward a front windshield and is reflected in a rearward direction of the vehicle by the front windshield, a lower end of the detecting region being spaced apart a predetermined distance upwardly from the instrument panel.

In accordance with a seventh aspect of the present invention, in the air bag apparatus for a passenger seat according to the first aspect, the second sensor is a sensor of an infrared beam interruption type which is disposed between a front pillar and the instrument panel such that a line connecting a transmitting sensor element and a receiving sensor element of the second sensor is located at a position spaced apart a predetermined distance upwardly from the instrument panel, a threshold time of an interruption time being set to less than or equal to several milliseconds.

In accordance with an eighth aspect of the present invention, there is provided an air bag apparatus for a passenger seat, comprising: a first sensor for detecting an occupant seated in a passenger seat and for detecting a position of the head of the occupant; and a deployment controller for changing the control of deployment of an air bag when the occupant and the position of the head of the occupant are detected by the first sensor.

In accordance with the first aspect of the present invention, even if the occupant seated in the passenger seat is detected by the first sensor, if the second sensor detects the state in which the occupant is approaching the instrument panel excluding the state in which the occupant puts out his or her hand(s) on the instrument panel, the deployment controller changes the control of deployment of the air bag.

Accordingly, in the first aspect of the present invention, since the apparatus comprises the first sensor for detecting the occupant seated in the passenger seat; the second sensor for detecting the state in which the occupant is approaching the instrument panel excluding the state in which the occupant puts out his or her hand(s) on the instrument panel; and the deployment controller for changing the control of deployment of the air bag when the state in which the occupant is approaching the instrument panel is detected by the second sensor, it is possible to obtain an outstanding advantage in that the air bag can be deployed positively in a condition for which the deployment of the air bag is desired.

In accordance with the second aspect of the present invention, even if the occupant in a seated state is detected by the first sensor constituted by an ultrasonic sensor, if the second sensor detects the state in which the occupant is approaching the instrument panel excluding the state in which the occupant puts out his or her hand(s) on the instrument panel, the deployment controller changes the control of deployment of the air bag.

Accordingly, in the second aspect of the present invention, in the air bag apparatus for a passenger seat according the first aspect of the invention, the first sensor is an ultrasonic sensor which is disposed at a vehicle compartment-side position in the vicinity of a connecting portion between a roof and a windshield of the vehicle and at a position on a passenger seat side, a detecting region of the first sensor being oriented downward and including a position of leg portions of the occupant in a seated state. Therefore, in addition to the advantage of the first aspect of the present invention, it is possible to obtain an outstanding advantage in that the presence or absence of the occupant can be detected irrespective of the sliding position of the seat.

In accordance with the third aspect of the present invention, even if the occupant seated in the passenger seat is detected by the first sensor, if the second sensor constituted by an ultrasonic sensor detects the occupant at a position spaced apart a predetermined distance upwardly from the instrument panel, the deployment controller changes the control of deployment of the air bag.

Accordingly, in the third aspect of the present invention, in the air bag apparatus for a passenger seat according to the first aspect of the invention, the second sensor is an ultrasonic sensor which is disposed at the vehicle compartment-side position in the vicinity of the connecting portion between the roof and the windshield of the vehicle and at the position on the passenger seat side, a detecting region of the second sensor being oriented toward the instrument panel and including a position spaced apart a predetermined distance upwardly from the instrument panel. Therefore, in addition to the advantage of the first aspect of the present invention, it is possible to obtain an outstanding advantage in that a child occupant located at a position spaced apart the predetermined distance upwardly from the instrument panel can be detected.

In accordance with the fourth aspect of the present invention, even if the occupant seated in the passenger seat is detected by the first sensor, if the second sensor detects the state in which the occupant is approaching the instrument panel excluding the state in which the occupant puts out his or her hand(s) on the instrument panel, and if the third sensor constituted by an ultrasonic sensor detects an object to be detected which is located between the instrument panel and the seat cushion and at a position below the instrument panel, the deployment controller changes the control of deployment of the air bag.

In the fourth aspect of the present invention, the arrangement provided is as follows: In the apparatus according to the second aspect of the present invention, the first sensor is an ultrasonic sensor which is disposed at a vehicle compartment-side position in the vicinity of a connecting portion between the roof and the windshield of the vehicle and at a position on a passenger seat side, a detecting region of the first sensor being oriented downward and including a position of leg portions of the occupant in a seated state; and the second sensor is an ultrasonic sensor which is disposed at a vehicle compartment-side position in the vicinity of a connecting portion between the roof and the windshield of the vehicle and at a position on a passenger seat side, a detecting region of the second sensor being oriented toward the instrument panel and including a position spaced apart a predetermined distance upwardly from the instrument panel. Further, the apparatus comprises a third sensor disposed between the first sensor and the second sensor and constituted by an ultrasonic sensor, a detecting region of the third sensor being oriented toward a space between the instrument panel and the seat cushion and including a position below the instrument panel. Therefore, in addition to the advantage of the first aspect of the present invention, it is possible to obtain outstanding advantages in that it is possible to detect an object to be detected which is located at a position below the instrument panel such as a child seat on the passenger seat, and that it is possible to speedily detect a state in which the occupant is excessively close to the instrument panel.

In accordance with the fifth aspect of the present invention, even if the occupant seated in the passenger seat is detected by the first sensor, when ultrasonic waves are oscillated in the rearward direction of the vehicle by the second sensor constituted by an ultrasonic sensor, and if the second sensor detects the occupant at a position spaced apart a predetermined distance upwardly from the instrument panel, the deployment controller changes the control of deployment of the air bag.

In the fifth aspect of the present invention, in the apparatus according to the first aspect of the invention, the arrangement provided is such that the second sensor is an ultrasonic sensor which is disposed on the instrument panel such that the detecting region of the second sensor is oriented in the rearward direction of the vehicle, a lower end of the detecting region including a position spaced apart a predetermined distance upwardly from the instrument panel. Accordingly, in addition to the advantage of the first aspect of the present invention, it is possible to obtain an outstanding advantage in that a distinction can be accurately made between the case where a child occupant is located between the passenger seat and the instrument panel and the case where the occupant stretched his or her hand(s) to the instrument panel.

In accordance with the sixth aspect of the present invention, even if the occupant seated in the passenger seat is detected by the first sensor, when ultrasonic waves are oscillated toward the front windshield by the second sensor constituted by an ultrasonic sensor and are reflected in the rearward direction of the vehicle by the front windshield, and if the second sensor detects the occupant at a position spaced apart a predetermined distance upwardly from the instrument panel, the deployment controller changes the control of deployment of the air bag.

In the sixth aspect of the present invention, in the apparatus according to the first aspect of the invention, the arrangement provided is such that the second sensor is an ultrasonic sensor which is disposed in the instrument panel such that the detecting region of the second sensor is oriented toward the front windshield and is reflected in the rearward direction of the vehicle by the front windshield, a lower end of the detecting region being spaced apart a predetermined distance upwardly from the instrument panel. Accordingly, in addition to the advantage of the first aspect of the present invention, it is possible to obtain an outstanding advantage in that the design feature, visibility, and the degree of freedom in designing the mounting position of the sensor improve.

In accordance with the seventh aspect of the present invention, even if the occupant seated in the passenger seat is detected by the first sensor, if the threshold time of the interruption time of the infrared beam emitted from the second sensor constituted by a sensor of an infrared beam interruption type is not less than or equal to several milliseconds, a determination is made that the occupant is in the state in which he or she is approaching the instrument panel excluding the state in which the occupant puts out his or her hand(s) on the instrument panel. As a result, the deployment controller changes the control of deployment of the air bag accordingly.

In the seventh aspect of the present invention, in the apparatus according to the first aspect of the invention, the second sensor is a sensor of the infrared beam interruption type which is disposed between the front pillar and the instrument panel such that a line connecting a transmitting sensor element and a receiving sensor element of the second sensor in front of the passenger seat is located at a position spaced apart a predetermined distance upwardly from the instrument panel, a threshold time of an interruption time being set to less than or equal to several milliseconds. Accordingly, in addition to the advantage of the first aspect of the present invention, it is possible to obtain an outstanding advantage in that a distinction can be clearly made between the case where the head of a child occupant moved forward and the case where the occupant stretched out his or her hand(s).

In accordance with the eighth aspect of the present invention, even if the occupant seated in the passenger seat is detected by the first sensor, if the state in which the head of the occupant is approaching the instrument panel is detected, the deployment controller changes the control of deployment of the air bag.

In the eighth aspect of the present invention, the arrangement provided is such that two distances for determination by the first sensor are set, and on the basis of a result of that determination a distinction is made between the case where the passenger seat has been moved to a forward-end position, and the head of the occupant seated in the passenger seat is located in the detecting region and the case where it is not, and the deployment controller changes the control of deployment of the air bag on the basis of the result of detection. Therefore, it is possible to obtain an outstanding advantage in that the air bag can be deployed positively in a condition for which the deployment of the air bag is desired. In addition, it suffices to use only one sensor, so that the configuration can be simplified.

The above and other objects, features and advantages of the present invention will become more apparent from the following detailed description of the invention when read in conjunction with the accompanying drawings.

DESCRIPTION OF THE PREFERRED EMBODIMENTS

Figure 1:
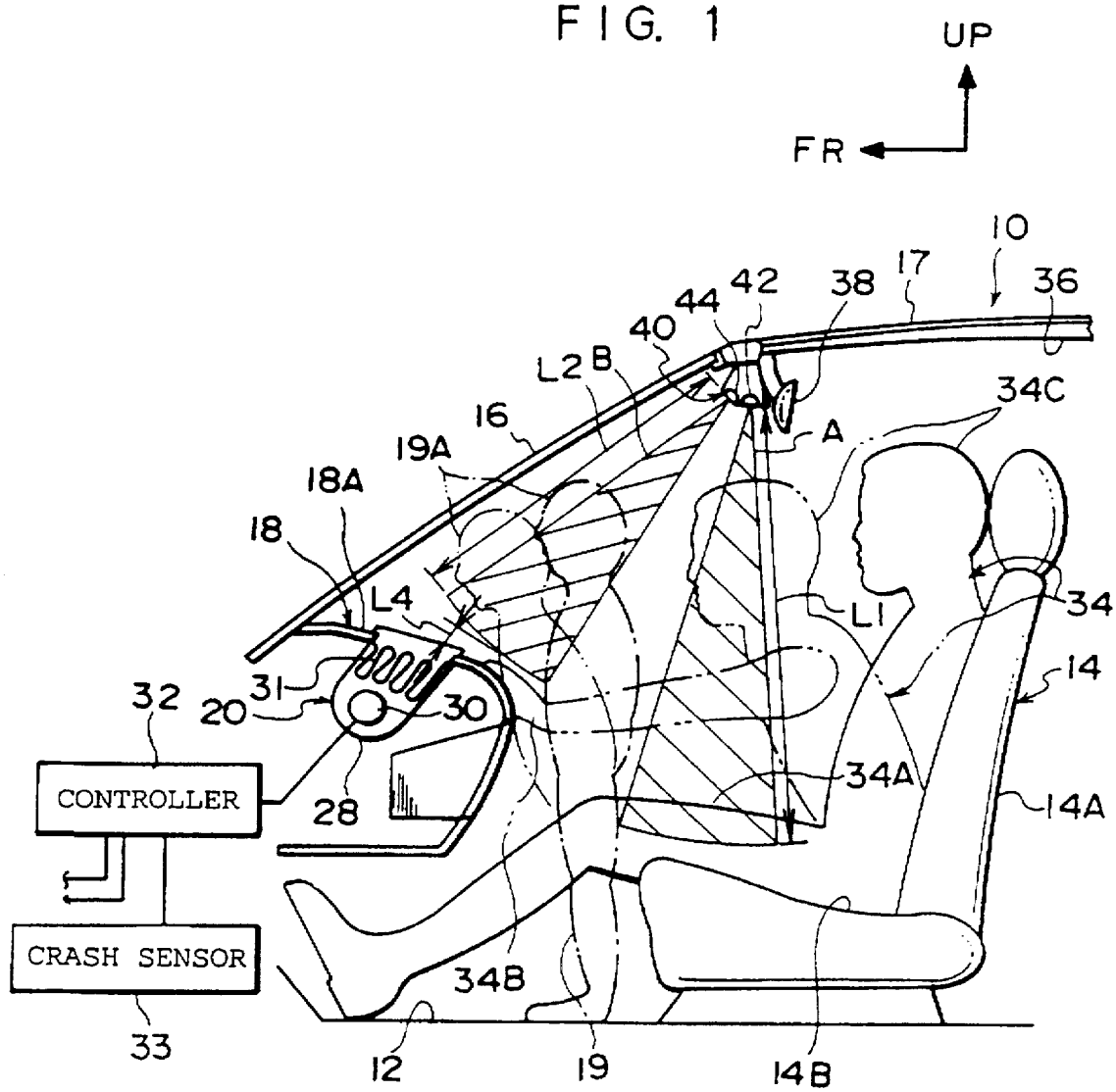
FIG. 1 is a schematic side elevational view illustrating an air bag apparatus for a passenger seat in accordance with a first embodiment of the present invention.
Figure 2:
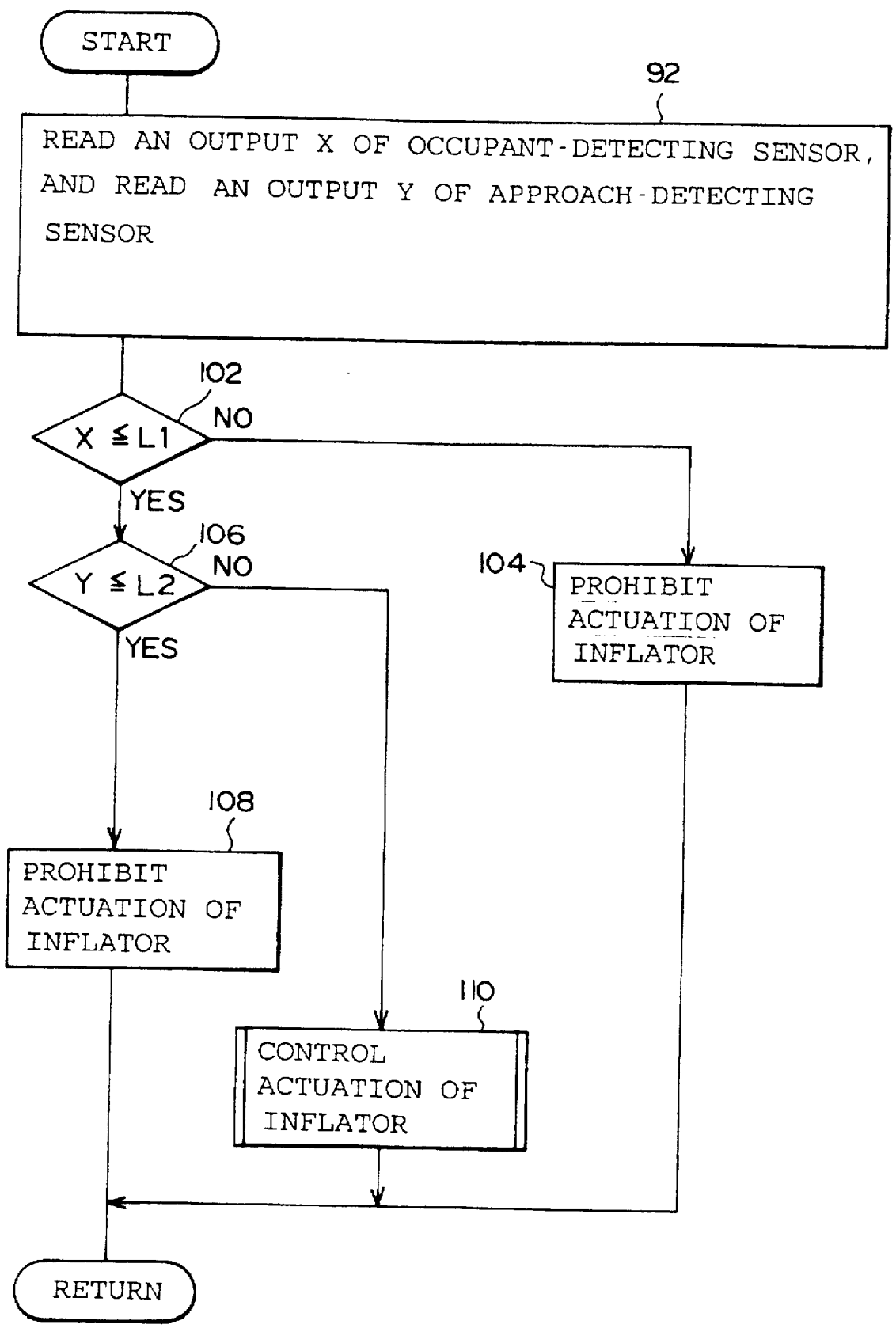
FIG. 2 is a flowchart illustrating occupant detection control in the air bag apparatus for a passenger seat in accordance with the first embodiment of the present invention.

Referring now to FIGS. 1 and 2, a description will be given of a first embodiment of an air bag apparatus for a passenger seat. Incidentally, in the drawings an arrow FR indicates a forward direction of the vehicle, while an arrow UP indicates an upward direction of the vehicle.

As shown in FIG. 1, a passenger seat 14 in which an occupant is seated is mounted on a floor surface 12 of a vehicle 10 by means of a pair of left and right rails (not shown) arranged in parallel in the longitudinal direction of the vehicle. As a result, the passenger seat 14 can be moved relatively in the longitudinal direction of the vehicle with respect to the floor surface 12. A windshield 16 is provided at a upper forward position of the vehicle as viewed from the passenger seat 14. An upper end of the windshield 16 is connected to a roof 17, while a lower end thereof is connected to a hood (not shown). An instrument panel 18 is disposed between the floor surface 12 and the windshield 16 in front of the passenger seat 14. The instrument panel 18, which is formed of a synthetic resin and has a substantially U-shaped cross section, is disposed with an opening of the substantially U-shaped cross section facing the forward direction of the vehicle.

A slight space is provided between the passenger seat 14 and the instrument panel 18 such that a child occupant 19 can stand between them.

An air bag apparatus 20 is installed in the instrument panel 18. An air bag case 28 of the air bag apparatus 20 has a substantially U-shaped cross section, and is disposed with an opening of the substantially U-shaped cross section facing the upwardly rearward direction of the vehicle. An inflator 30 is disposed at the bottom of the air bag case 28, and an air bag 31 is accommodated in a folded state in the vicinity of the opening of the air bag case 28. When the inflator 30 generates a gas, the air bag 31 is inflated, and projects through the opening in the instrument panel 18 toward the head 34C of an occupant 34 seated in the passenger seat 14.

The inflator 30 in the air bag case 28 is electrically connected to an air-bag controlling circuit 32 serving as a deployment controlling device and comprised of a microcomputer. A crash sensor 33 for detecting the acceleration acting on the vehicle is electrically connected to the air-bag controlling circuit 32.

A sensor box 40 is provided at a vehicle compartment-side position in the vicinity of a connecting portion between the roof 17 and the windshield 16 at a position on the passenger seat side as viewed in the transverse direction of the vehicle. Incidentally, the sensor box 40 may be provided in the vicinity of an upper end of an unillustrated front pillar. The sensor box 40 is provided with an occupant-detecting sensor 42 and an approach-detecting sensor 44. The occupant-detecting sensor 42, which serves as a first sensor constituted by an ultrasonic sensor, is provided on the rear side of the approach-detecting sensor 44 as viewed in the longitudinal direction of the vehicle, and is connected to the air-bag controlling circuit 32. The occupant-detecting sensor 42, which is constituted by a transmitting element and a receiving element (not shown), is disposed such that its detecting region A is oriented downward and includes the position of leg portions 34A of the occupant 34 seated in the passenger seat 14. Namely, the occupant-detecting sensor 42 detects the distance to a seat cushion 14B of the passenger seat 14 as well as the distance to the leg portions 34A of the passenger 34. On the basis of these distances, a determination is made by the air-bag controlling circuit 32 as to whether or not the occupant 34 is seated. The distance for this determination is set to be L1, and if a detected distance X is less than or equal to L1, a determination is made that the occupant 34 is seated.

On the other hand, if a determination is made that the occupant 34 is not present in the seat, even if a crash signal is inputted from the crash sensor 33, the air-bag controlling circuit 32 does not actuate the inflator 30.

The approach-detecting sensor 44, which serves as a second sensor constituted by an ultrasonic sensor, is disposed on the front side of the occupant-detecting sensor 42 as viewed in the longitudinal direction of the vehicle. The approach-detecting sensor 44 is electrically connected to the air-bag controlling circuit 32. The approach-detecting sensor 44, which is constituted by a transmitting element and a receiving element (not shown), is disposed such that its detecting region B is oriented toward the instrument panel 18 and includes a position spaced apart a predetermined distance L4 upwardly from the instrument panel 18. Namely, the approach-detecting sensor 44 is adapted to detect the distance to an upper half body 19A of the child occupant 19. Further, on the basis of these distances detected, the air-bag controlling circuit 32 determines whether the occupant 34 stretched out his or her hand(s) 34B or the child occupant 19 is standing between the passenger seat 14 and the instrument panel 18.

The distance for this determination is set to be L2 which is obtained by subtracting the aforementioned predetermined distance L4 from the distance from the approach-detecting sensor 44 to the instrument panel 18. If a detected distance Y is less than or equal to L2, a determination is made that the child occupant 19 is standing between the passenger seat 14 and the instrument panel 18. Meanwhile, if the detected distance Y is greater than L2, a determination is made that the occupant 34 stretched his or her hand(s) 34B.

Next, referring to the flowchart shown in FIG. 2, a description will be given of the operation of the first embodiment.

In Step 92, the air-bag controlling circuit 32 in the first embodiment reads the output of the occupant-detecting sensor 42. At this time, if the occupant 34 is seated on the seat cushion 14B of the passenger seat 14 as shown by the solid lines in FIG. 1, the occupant-detecting sensor 42 outputs the distance X from the sensor 42 to the leg portions 34A of the occupant 34 to the air-bag controlling sensor 32.

Also, in Step 92, the output of the approach-detecting sensor 44 is read. At this time, if the child occupant 19 is standing between the passenger seat 14 and the instrument panel 18 as shown by the reference lines and phantom lines in FIG. 1, the approach-detecting sensor 44 outputs the distance Y from the sensor 44 to the upper half body 19A of the child occupant 19 to the air-bag controlling sensor 32.

Then, in Step 102, a determination is made as to whether or not the detected distance X is less than or equal to the distance L1 for determination.

If it is determined in Step 102 that the detected distance X is not less than or equal to the distance L1 for determination (i.e., if it is determined that the occupant 34 is not seated on the seat cushion 14B of the passenger seat 14), in Step 104 the inflator 30 is not actuated so as not to deploy the air bag 31.

Meanwhile, if it is determined in Step 102 that the detected distance X is less than or equal to the distance L1 for determination (i.e., if it is determined that the occupant 34 is seated on the seat cushion 14B of the passenger seat 14), in Step 106 a determination is made as to whether or not the detected distance Y is less than or equal to the distance L2 for determination.

If it is determined in Step 106 that the detected distance Y is less than or equal to the distance L2 for determination (i.e., if it is determined that the child occupant 19 is standing between the passenger seat 14 and the instrument panel 18), in Step 108 the inflator 30 is not actuated so as not to deploy the air bag 31.

Meanwhile, if it is determined in Step 106 that the detected distance Y is not less than or equal to the distance L2 for determination (in a case where the occupant 34 stretched out his or her hand(s) 34B to the instrument panel 18), the operation proceeds to Step 110 to provide control for actuating the inflator 30 under a predetermined condition. For instance, if the crash signal is inputted from the crash sensor 33, the inflator 30 is actuated to deploy the air bag 31.

Accordingly, in the first embodiment, on the basis of the output from the approach-detecting sensor 44 a distinction is made between the case where the child occupant 19 is standing between the passenger seat 14 and the instrument panel 18 and the case where the occupant 34 stretched his or her hand(s) 34B to the instrument panel 18, and the inflator 30 is controlled on the basis of the detected result. Therefore, the air bag 31 can be deployed positively in a condition for which the deployment of the air bag 31 is desired. In addition, the presence or absence of the occupant 34 can be detected irrespective of the sliding position of the passenger seat 14.

Incidentally, an arrangement may be provided such that in a case where the child occupant 19 is standing between the passenger seat 14 and the instrument panel 18, the attention of the driver and the child occupant 19 is called by means of a warning means such as a buzzer, a flash lamp or the like.

Although a description has been given by citing the case where the child occupant 19 is standing as a case in which the air bag apparatus 20 is not operated, the actuation of the inflator 30 can also be prohibited in a case where the occupant 34 seated in the passenger seat 14 has bent forward by a large degree and the head 34C of the occupant 34 has reached the detecting region B.

Figure 3:
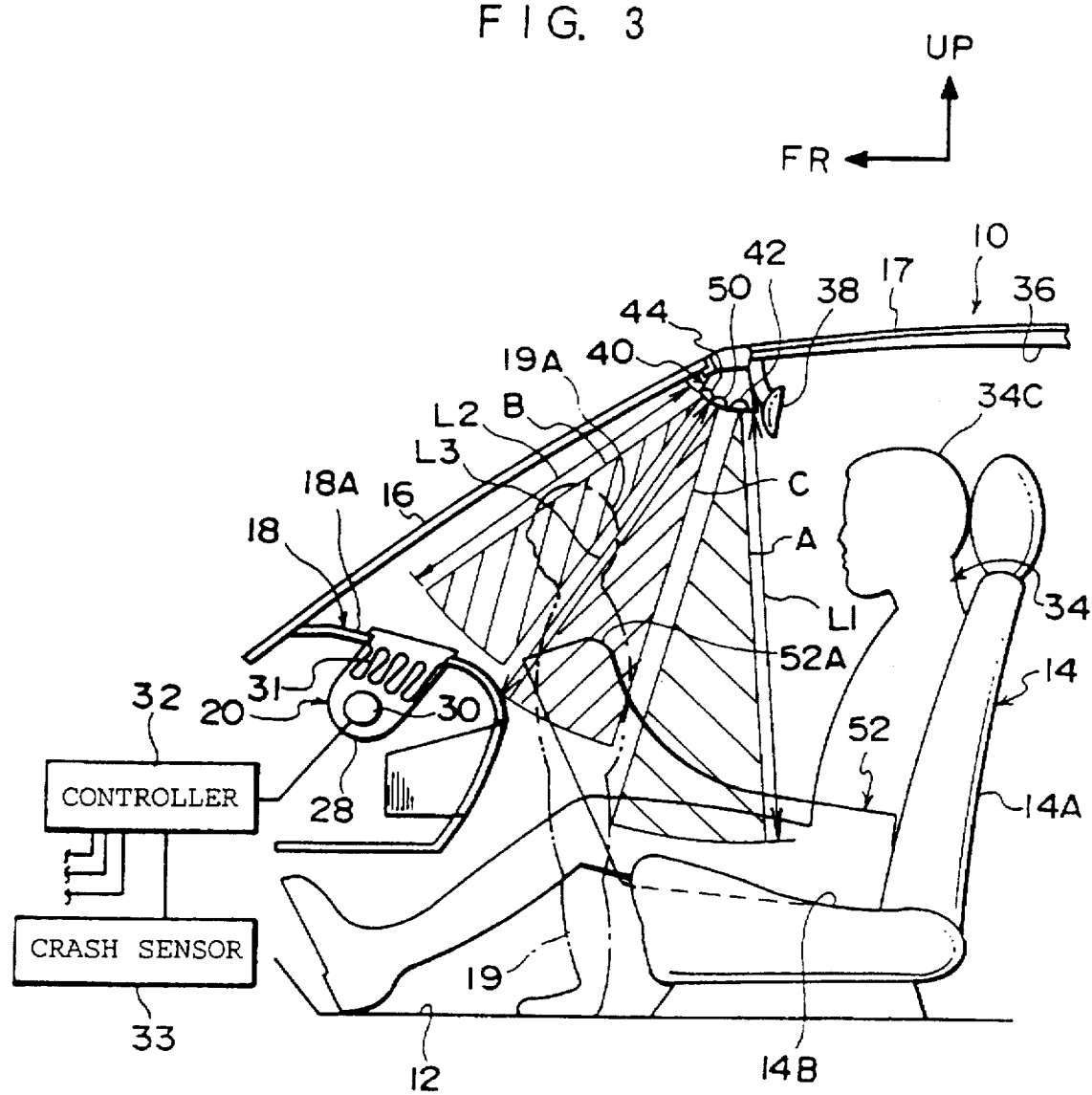
FIG. 3 is a schematic side elevational view illustrating the air bag apparatus for a passenger seat in accordance with a second embodiment of the present invention.
Figure 4:
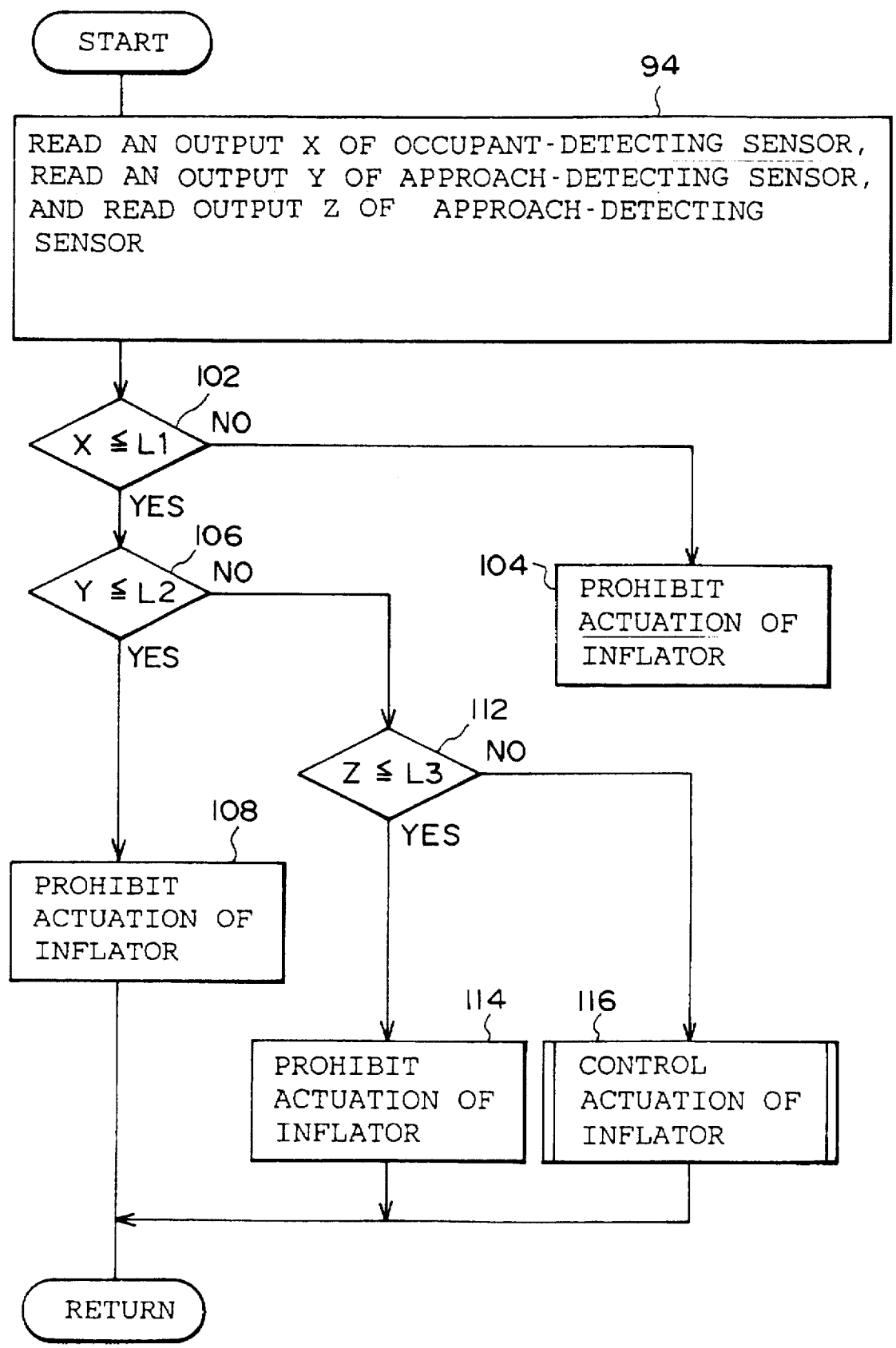
FIG. 4 is a flowchart illustrating occupant detection control in the air bag apparatus for a passenger seat in accordance with the second embodiment of the present invention.

Referring now to FIGS. 3 and 4, a description will be given of a second embodiment of the air bag apparatus for a passenger seat in accordance with the present invention. Incidentally, the same members as those of the first embodiment will be denoted by the same reference numerals, and a description thereof will be omitted.

As shown in FIG. 3, in the second embodiment, an approach-detecting sensor 50, which serves as a third sensor constituted by an ultrasonic sensor, is disposed between the occupant-detecting sensor 42 and the approach-detecting sensor 44 in the sensor box 40. This approach-detecting sensor 50 is electrically connected to the air-bag controlling circuit 32. The approach-detecting sensor 50, which is constituted by a transmitting element and a receiving element (not shown), is disposed such that its detecting region C is oriented toward a space between the seat cushion 14B of the passenger seat 14 and the instrument panel 18 and includes a position below an upper surface 18A of the instrument panel 18. Namely, the approach-detecting sensor 50 is adapted to detect the distance to an object, e.g., a child seat 52, located at a position below the upper surface 18A of the instrument panel 18 between the passenger seat 14 and the instrument panel 18. On the basis of the distance thus detected, the air-bag controlling circuit 32 determines whether the child seat 52 is present between the passenger seat 14 and the instrument panel 18. The distance for this determination is set to be L3 (L2≦L3≦L1), and if a detected distance Z is less than or equal to L3, a determination is made that an object to be detected, such as the child seat 52, is present.

Further, if a determination is made that an object to be detected, such as the child seat 52, is present, even if the crash signal is inputted from the crash sensor 33, the air-bag controlling sensor 32 does not actuate the inflator 30.

Next, referring to the flowchart shown in FIG. 4, a description will be given of the operation of the second embodiment. Incidentally, the same processing as that of the first embodiment will be denoted by the same step numbers, and a description thereof will be omitted.

As shown in FIG. 4, in Step 94, the air-bag controlling sensor 32 in this embodiment reads an output Z of the approach-detecting sensor 50 in addition to the outputs X and Y in Step 92 shown in FIG. 2. At this time, if a part 52A of the child seat 52 is projecting between the passenger seat 14 and the instrument panel 18 as shown by the solid lines in FIG. 3, the approach-detecting sensor 50 outputs the distance from the sensor 50 to the part 52A of the child seat 52 to the air-bag controlling sensor 32.

Further, if it is determined in Step 106 that the detected distance Y is not less than or equal to the distance L2 for determination (i.e., if it is determined that the child occupant 19 is not standing between the passenger seat 14 and the instrument panel 18), the operation proceeds to Step 112 to determine whether or not the detected distance Z is less than or equal to L3.

If it is determined in Step 112 that the detected distance Z is less than or equal to the distance L3 for determination (i.e., if it is determined that the part 52A of the child seat 52 is projecting between the passenger seat 14 and the instrument panel 18), in Step 114 the inflator 30 is not actuated so as not to deploy the air bag 31.

Meanwhile, if it is determined in Step 112 that the detected distance Z is not less than or equal to the distance L3 for determination (i.e., if it is determined that the part 52A of the child seat 52 is not projecting between the passenger seat 14 and the instrument panel 18), the operation proceeds to Step 116 to provide control for actuating the inflator 30 under a predetermined condition. For instance, if the crash signal is inputted from the crash sensor 33, the inflator 30 is actuated to deploy the air bag 31.

Accordingly, in the second embodiment, on the basis of the output from the approach-detecting sensor 50 whose distance L3 for determination is set such that L2≦L3≦L1, a determination is made as to whether or not an object to be detected, such as the child seat 52, is present between the passenger seat 14 and the instrument panel 18, and the inflator 30 is controlled on the basis of the detected result. Therefore, the air bag 31 can be deployed positively in a condition for which the deployment of the air bag 31 is desired.

Incidentally, a continuous detecting time t3, for which a determination is made that control is necessary in a case where the object to be detected is present in the detecting region C, is set to be equal to or shorter than a continuous detecting time t1, for which a determination is made that control is necessary in a case where the object to be detected is present in the detecting region A, and is set to be equal to or longer than a continuous detecting time t2, for which a determination is made that control is necessary in a case where the object to be detected is present in the detecting region B. Consequently, in a case where the occupant is located in the vicinity of the air bag apparatus 20, the closer the occupant to the air bag apparatus 20, the shorter the determining time becomes, and in a state in which the occupant is excessively close to the air bag apparatus 20, a determination is speedily made for prohibiting the deployment of the air bag 31.

Incidentally, an arrangement may be provided such that in the case where the child occupant 19 is standing between the passenger seat 14 and the instrument panel 18, the attention of the driver and the child occupant 19 may be called by means of a warning means such as a buzzer, a flash lamp or the like.

Next, referring to FIGS. 5 and 6, a description will be given of a third embodiment of the air bag apparatus for a passenger seat in accordance with the present invention. Incidentally, the same members as those of the first embodiment will be denoted by the same reference numerals, and a description thereof will be omitted.

Figure 5:
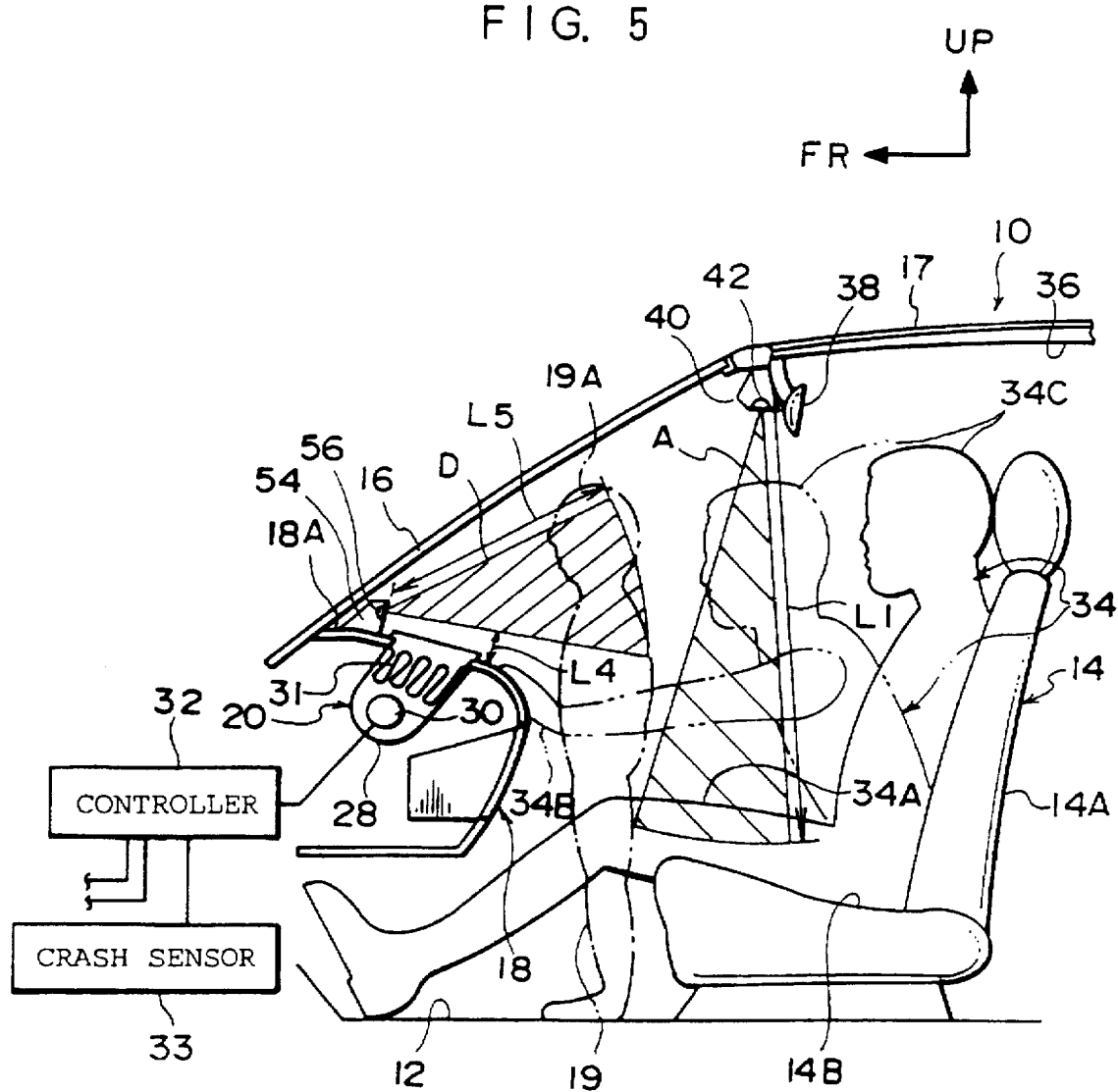
FIG. 5 is a schematic side elevational view illustrating the air bag apparatus for a passenger seat in accordance with a third embodiment of the present invention.

As shown in FIG. 5, in the third embodiment, a sensor box 54 is disposed in the vicinity of a forward end of the upper surface 18A of the instrument panel 18. An approach-detecting sensor 56, which serves as the second sensor constituted by an ultrasonic sensor, is disposed in the sensor box 54. The approach-detecting sensor 56 is electrically connected to the air-bag controlling circuit 32. The approach-detecting sensor 56, which is constituted by a transmitting element and a receiving element (not shown), is disposed such that its detecting region D is oriented in the rearward direction of the vehicle. A lower end of the detecting region D includes a position spaced apart the predetermined distance L4 upwardly from the upper surface 18A of the instrument panel 18.

Namely, the approach-detecting sensor 56 does not detect the hand(s) of the occupant 34 stretched out to the instrument panel 18, but detects the distance from the sensor 56 to the upper half body 19A of the child occupant 19 located above the hand(s) 34B. On the basis of the distance thus detected, the air-bag controlling circuit 32 determines whether or not the upper half body 19A of the child occupant 19 is present. The distance for this determination is set to be a predetermined distance L5 from the approach-detecting sensor 56, and if a detected distance M is less than or equal to L5, a determination is made that the upper half body 19A is present. In this case, even if the crash signal is inputted from the crash sensor 33, the air-bag controlling sensor 32 does not actuate the inflator 30.

On the other hand, if the head 34C of the occupant 34 is detected in a state in which the occupant 34 stretched out his or her hand(s) (i.e., the state indicated by the phantom lines in FIG. 5), the detected distance M becomes greater than L5. As a result, if the crash signal is inputted from the crash sensor 33, the air-bag controlling sensor 32 actuates the inflator 30.

Next, referring to the flowchart shown in FIG. 6, a description will be given of the operation of the third embodiment. Incidentally, the same processing as that of the first embodiment will be denoted by the same step numbers, and a description thereof will be omitted.

Figure 6:
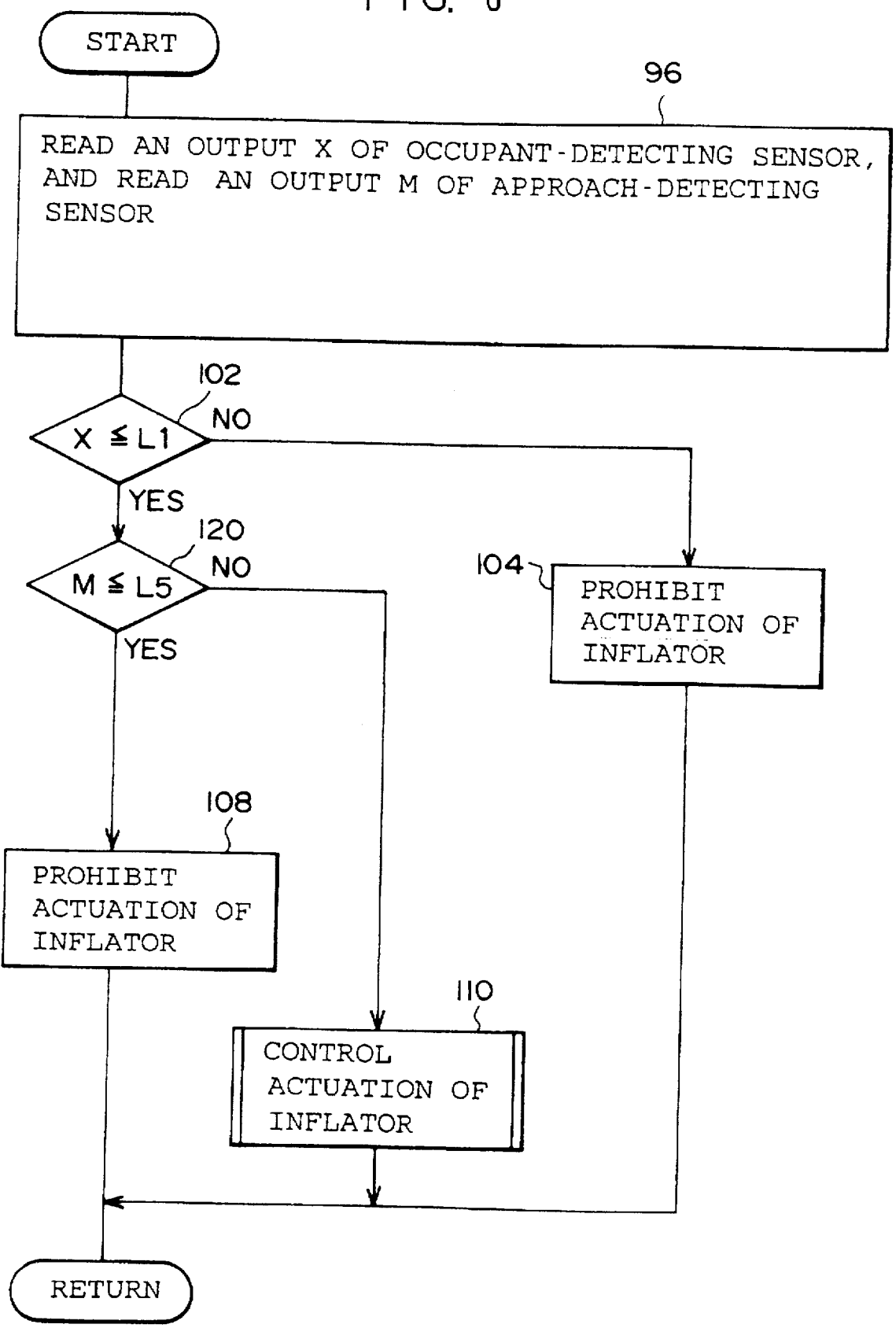
FIG. 6 is a flowchart illustrating occupant detection control in the air bag apparatus for a passenger seat in accordance with the third embodiment of the present invention.

As shown in FIG. 6, in Step 96, the air-bag controlling sensor 32 in this embodiment reads the output X of the occupant-detecting sensor 42 and the output of the approach-detecting sensor 56. At this time, if the child occupant 19 is standing between the passenger seat 14 and the instrument panel 18, the approach-detecting sensor 56 outputs the detected distance to the upper half body 19A of the child occupant 19 to the air-bag controlling sensor 32.

Further, if a determination is made in Step 102 that the detected distance X is less than or equal to the distance L1 for determination (i.e., if it is determined that the occupant 34 is seated on the seat cushion 14B of the passenger seat 14), a determination is made in Step 120 as to whether or not the detected distance M is less than or equal to the distance L5 for determination.

If it is determined in Step 120 that the detected distance M is less than or equal to the distance L5 for determination (i.e., if it is determined that the child occupant 19 is standing between the passenger seat 14 and the instrument panel 18), in Step 108 the inflator 30 is not actuated so as not to deploy the air bag 31.

Meanwhile, if it is determined in Step 120 that the detected distance M is not less than or equal to the distance L5 for determination (i.e., if the occupant 34 stretched out his or her hand(s) to the instrument panel 18), the operation proceeds to Step 110 to provide control for actuating the inflator 30 under a predetermined condition. For instance, if the crash signal is inputted from the crash sensor 33, the inflator 30 is actuated to deploy the air bag 31.

Accordingly, in the third embodiment, on the basis of the output from the approach-detecting sensor 56 a distinction is made between the case where the child occupant 19 is standing between the passenger seat 14 and the instrument panel 18 and the case where the occupant 34 stretched out his or her hand(s) 34B to the instrument panel 18, and the inflator 30 is controlled on the basis of the detected result. Therefore, the air bag 31 can be deployed positively in a condition for which the deployment of the air bag 31 is desired.

Incidentally, an arrangement may be provided such that in the case where the child occupant 19 is standing between the passenger seat 14 and the instrument panel 18, the attention of the driver and the child occupant 19 is called by means of a warning means such as a buzzer, a flash lamp or the like.

Although a description has been given of the case where the child occupant 19 is standing as the case in which the air bag apparatus 20 is not actuated, the actuation of the inflator 30 can also be prohibited in a case where the occupant 34 seated in the passenger seat 14 has bent forward by a large degree and has reached the detecting region D of the approach-detecting sensor 56.

Figure 7:
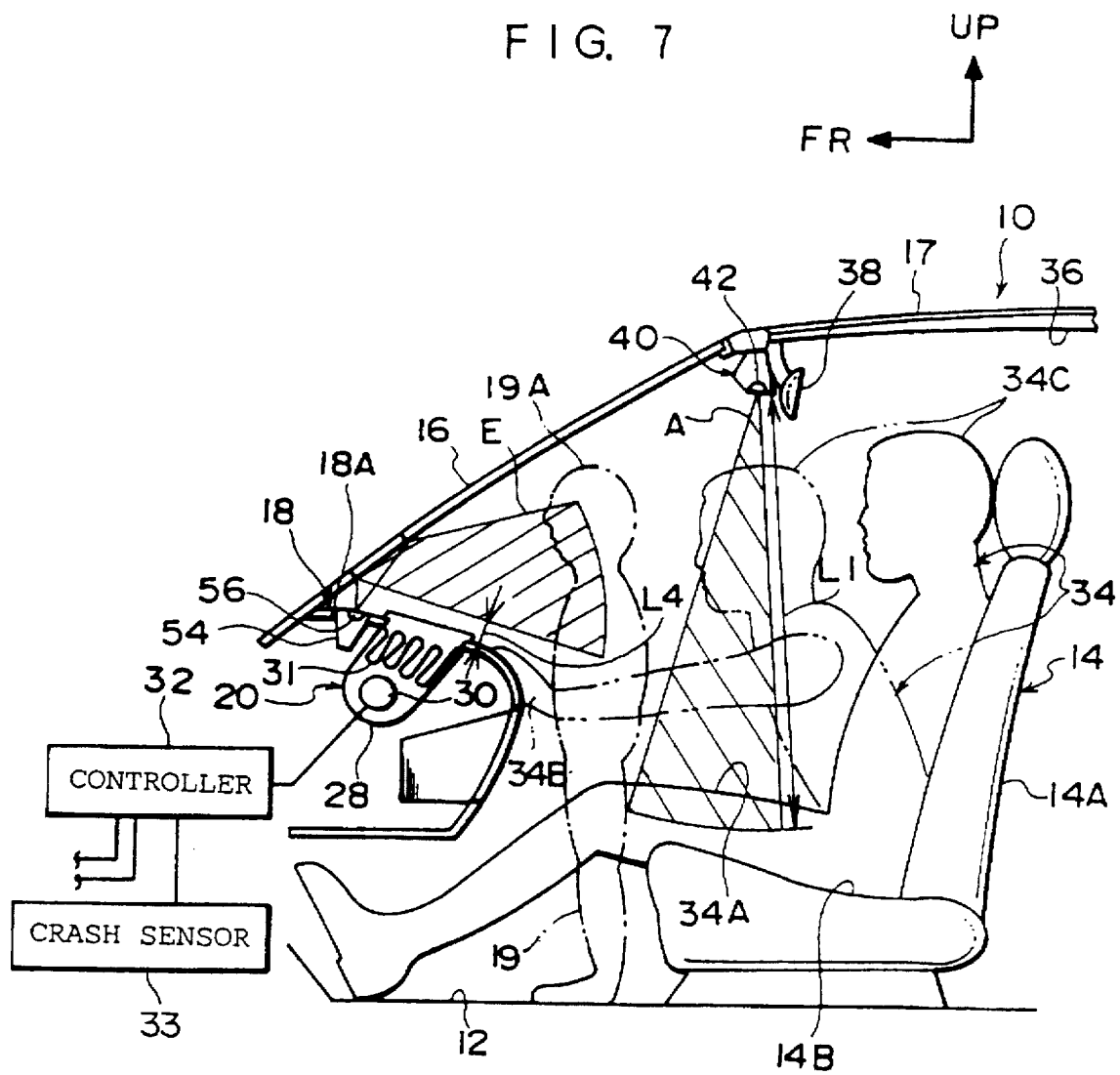
FIG. 7 is a schematic side elevational view illustrating the air bag apparatus for a passenger seat in accordance with a modification of the third embodiment of the present invention.

In addition, although in the third embodiment the sensor box 54 is disposed in the vicinity of the forward end of the upper surface 18A of the instrument panel 18, and the approach-detecting sensor 56 is disposed in the sensor box 54, the approach-detecting sensor 56 may alternately be disposed in the sensor box 54 embedded in the vicinity of the forward end of the upper surface 19A of the instrument panel 18 in such a manner as to be oriented toward the windshield 16, as shown in FIG. 7. In this case, its detecting region E is reflected by the windshield 16 and is oriented in the rearward direction of the vehicle, and a lower end of the detecting region E is at a position spaced apart the predetermined distance L4 upwardly from the upper surface 18A of the instrument panel 18.

Accordingly, in this arrangement, since the detecting region E is reflected by the windshield 16, it is unnecessary to dispose the approach-detecting sensor 56 at the position spaced apart upwardly from the upper surface 18A of the instrument panel 18. Hence, the design feature, visibility, and the degree of freedom in designing the mounting position of the sensor improve.

Next, referring to FIGS. 8 to 10, a description will be given of a fourth embodiment of the air bag apparatus for a passenger seat in accordance with the present invention. Incidentally, the same members as those of the first embodiment will be denoted by the same reference numerals, and a description thereof will be omitted.

Figure 8:
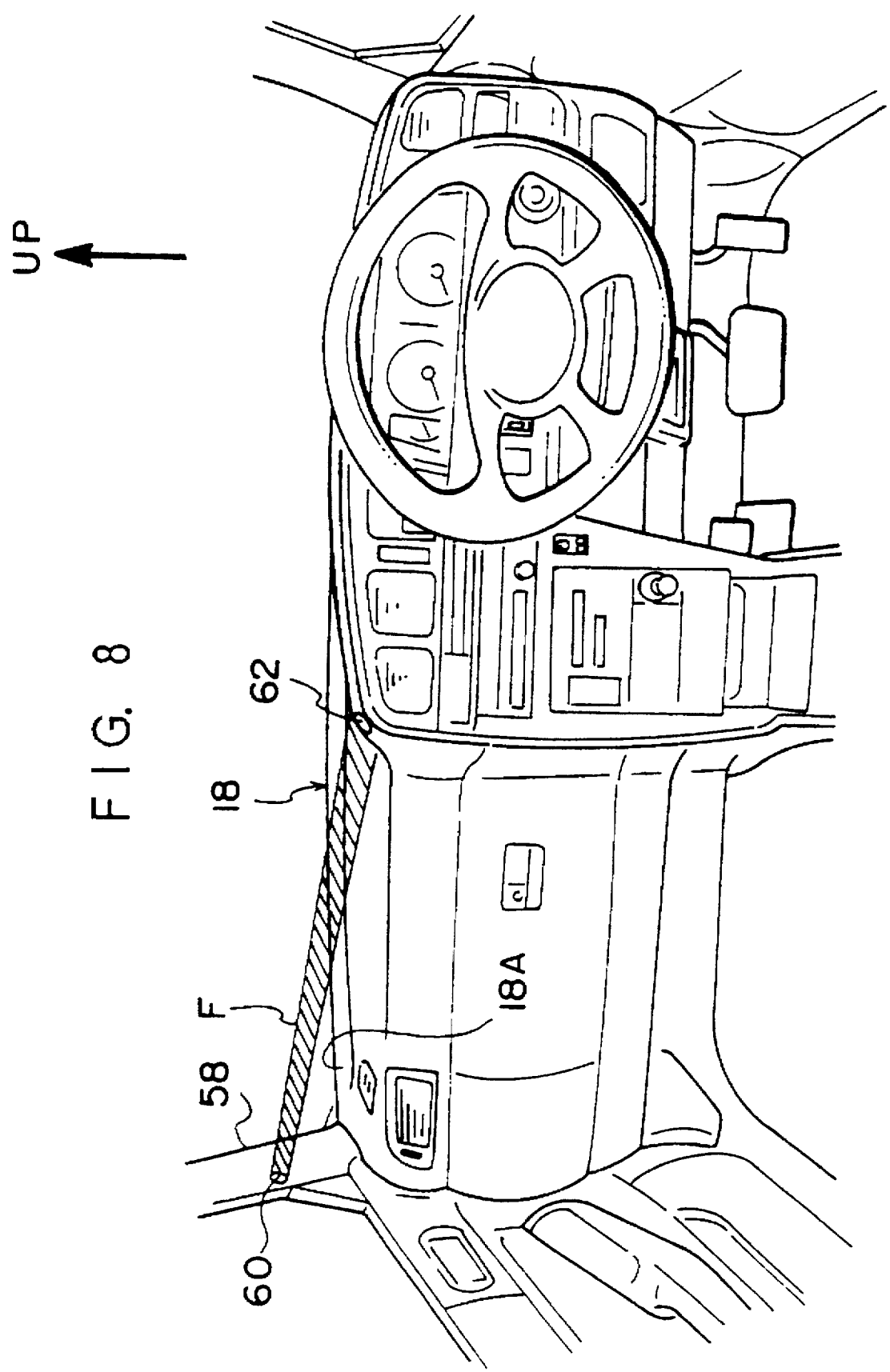
FIG. 8 is a schematic diagram illustrating a front section of a vehicle compartment to which the air bag apparatus for a passenger seat in accordance with a fourth embodiment of the present invention is applied.

As shown in FIG. 8, in the fourth embodiment, a transmitting side 60 of an approach-detecting sensor, which serves as the second sensor constituted by a sensor of an infrared beam interruption type, is disposed on a front pillar 58 on the passenger seat side in the vicinity of the upper surface 18A of the instrument panel 18. A receiving side 62 of the approach-detecting sensor is disposed on a substantially central portion, as viewed in the transverse direction of the vehicle, of the upper surface 18A of the instrument panel 18. The transmitting side 60 and the receiving side 62 of the approach-detecting sensor are electrically connected to the air-bag controlling circuit 32.

Figure 9:
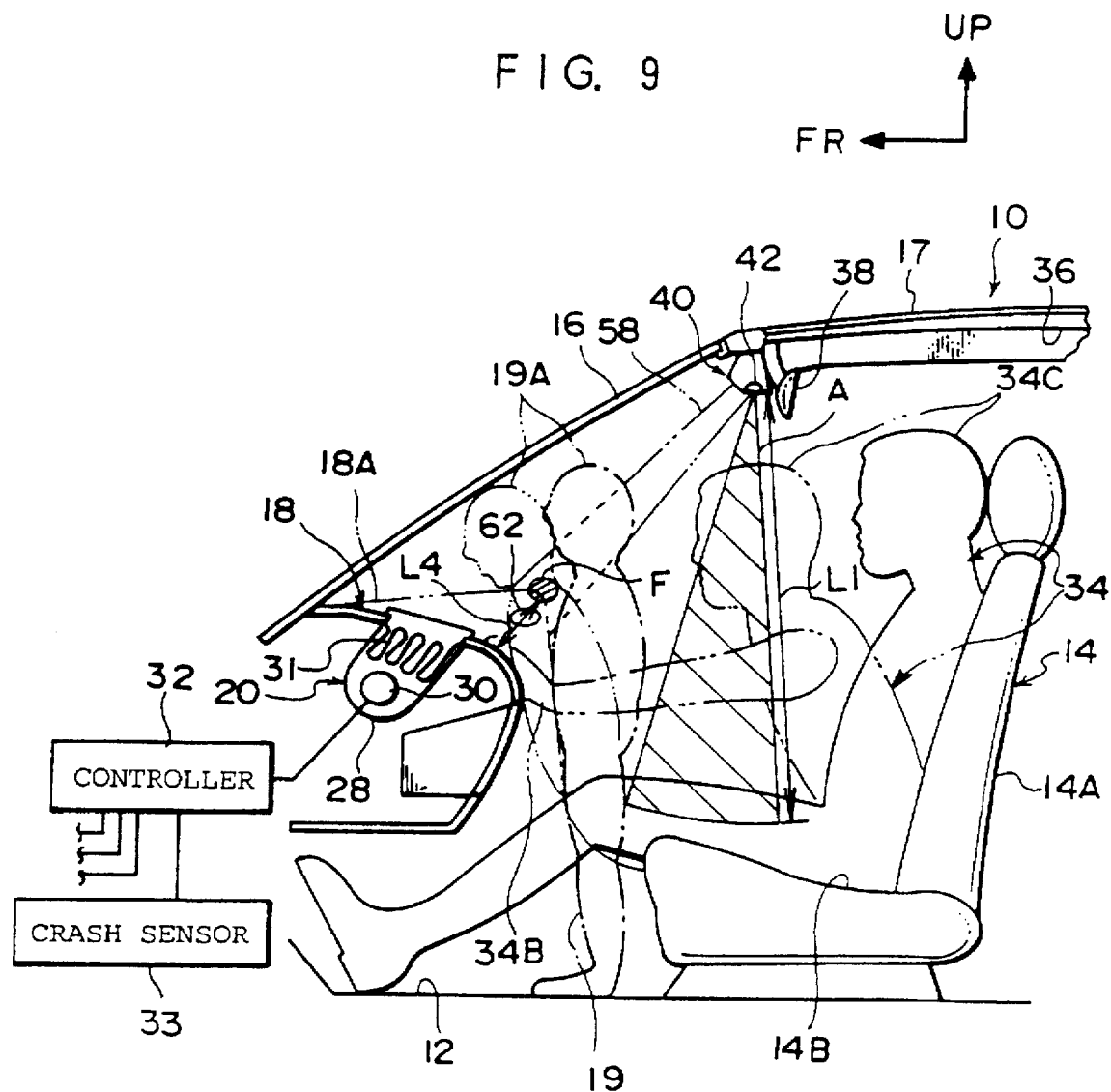
FIG. 9 is a schematic side elevational view illustrating the air bag apparatus for a passenger seat in accordance with the fourth embodiment of the present invention.

As shown in FIGS. 8 and 9, as for a detecting region F connecting the transmitting side 60 and the receiving side 62 of the approach-detecting sensor in a straight line, its lower end in front of the occupant 34 seated in the passenger seat 14 is spaced apart the predetermined distance L4 upwardly from the upper surface 18A of the instrument panel 18.

Namely, the infrared beam emitted from the transmitting side 60 to the receiving side 62 of the approach-detecting sensor is adapted to be interrupted by the hand(s) 34B of the occupant 34 stretched out to the instrument panel 18 or by the upper half body 19A of the child occupant 19 which moved forward. On the basis of the interruption time at that time, the air-bag controlling sensor 32 determines the presence of the hand(s) 34B of the occupant 34 and the upper half body 19A of the child occupant 19.

If it is determined that the upper half body 19A of the child occupant 19 is present, even if the crash signal is inputted from the crash sensor 33, the air-bag controlling sensor 32 does not actuate the inflator 30.

On the other hand, if it is determined that the occupant 34 stretched out his or her hand(s) 34B, if the crash signal is inputted from the crash sensor 33, the air-bag controlling sensor 32 actuates the inflator 30.

Next, referring to the flowchart shown in FIG. 10, a description will be given of the operation of the fourth embodiment. Incidentally, the same processing as that of the first embodiment will be denoted by the same step numbers, and a description thereof will be omitted.

Figure 10:
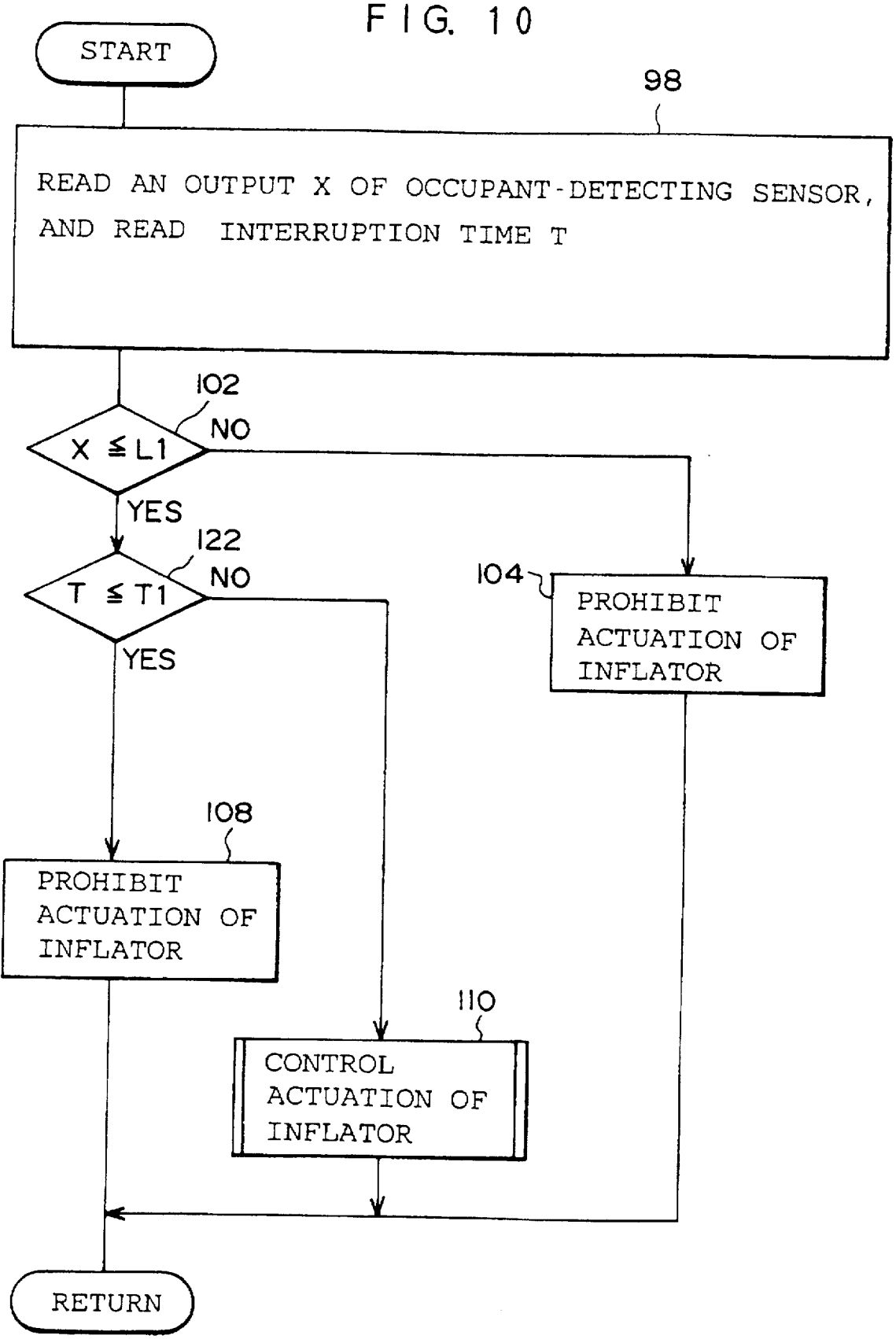
FIG. 10 is a flowchart illustrating occupant detection control in the air bag apparatus for a passenger seat in accordance with the fourth embodiment of the present invention.

As shown in FIG. 10, in Step 98, the air-bag controlling sensor 32 in the fourth embodiment reads the output X of the occupant-detecting sensor 42, and measures the time T of interruption of the infrared beam at the receiving side 62 of the approach-detecting sensor.

In addition, if it is determined in Step 102 that the detected distance X is less than or equal to the distance L1 for determination (i.e., if it is determined that the occupant 34 is seated on the seat cushion 14B of the passenger seat 14), a determination is made in Step 122 as to whether or not the time T of interruption of the infrared beam is greater than or equal to a threshold time T1 (which is set to several milliseconds or less by taking into consideration the state in which the occupant 34 instantaneously puts out his or her hand(s) on the instrument panel 18 owing to the deceleration of the vehicle due to braking or the like).

If it is determined in Step 122 that the time T of interruption of the infrared beam is greater than or equal to the threshold time T1 (i.e., the upper half body 19A of the child occupant 19 has moved to the position indicated by the phantom lines in FIG. 9 due to braking or the like), the operation proceeds to Step 108 in which the inflator 30 is not actuated so as not to deploy the air bag 31.

Meanwhile, if it is determined in Step 122 that the time T of interruption of the infrared beam is not greater than or equal to the threshold time T1 (i.e., the hand(s) 34B of the occupant 34 passed when moving to the position indicated by the phantom lines in FIG. 9 due to braking or the like), the operation proceeds to Step 110 to provide control for actuating the inflator 30 under a predetermined condition. For instance, if the crash signal is inputted from the crash sensor 33, the inflator 30 is actuated to deploy the air bag 31.

Accordingly, in the fourth embodiment, on the basis of the time T of interruption of the infrared beam at the receiving side 62 of the approach-detecting sensor, a distinction is made between the case where the child occupant 19 is standing between the passenger seat 14 and the instrument panel 18 and the case where the occupant 34 stretched his or her hand(s) 34B to the instrument panel 18, and the inflator 30 is controlled on the basis of the detected result. Therefore, the air bag 31 can be deployed positively in a condition for which the deployment of the air bag 31 is desired.

Incidentally, an arrangement may be provided such that in a case where the child occupant 19 is standing between the passenger seat 14 and the instrument panel 18, the attention of the driver and the child occupant 19 is called by means of a warning means such as a buzzer, a flash lamp or the like.

As described above, the transmitting side 60 of the approach-detecting sensor is disposed on the front pillar 58 on the passenger seat side in the vicinity of the upper surface 18A of the instrument panel 18, and the receiving side 62 of the approach-detecting sensor is disposed in a substantially central portion, as viewed in the transverse direction of the vehicle, of the upper surface 18A of the instrument panel 18. Alternatively, the receiving side of the approach-detecting sensor may be disposed on the front pillar 58 on the passenger seat side in the vicinity of the upper surface 18A of the instrument panel 18, and the transmitting side of the approach-detecting sensor may be disposed in the substantially central portion, as viewed in the transverse direction of the vehicle, of the upper surface 18A of the instrument panel 18.

Next, referring to FIGS. 11 and 12, a description will be given of a fifth embodiment of the air bag apparatus for a passenger seat in accordance with the present invention. Incidentally, the same members as those of the first embodiment will be denoted by the same reference numerals, and a description thereof will be omitted.

Figure 11:
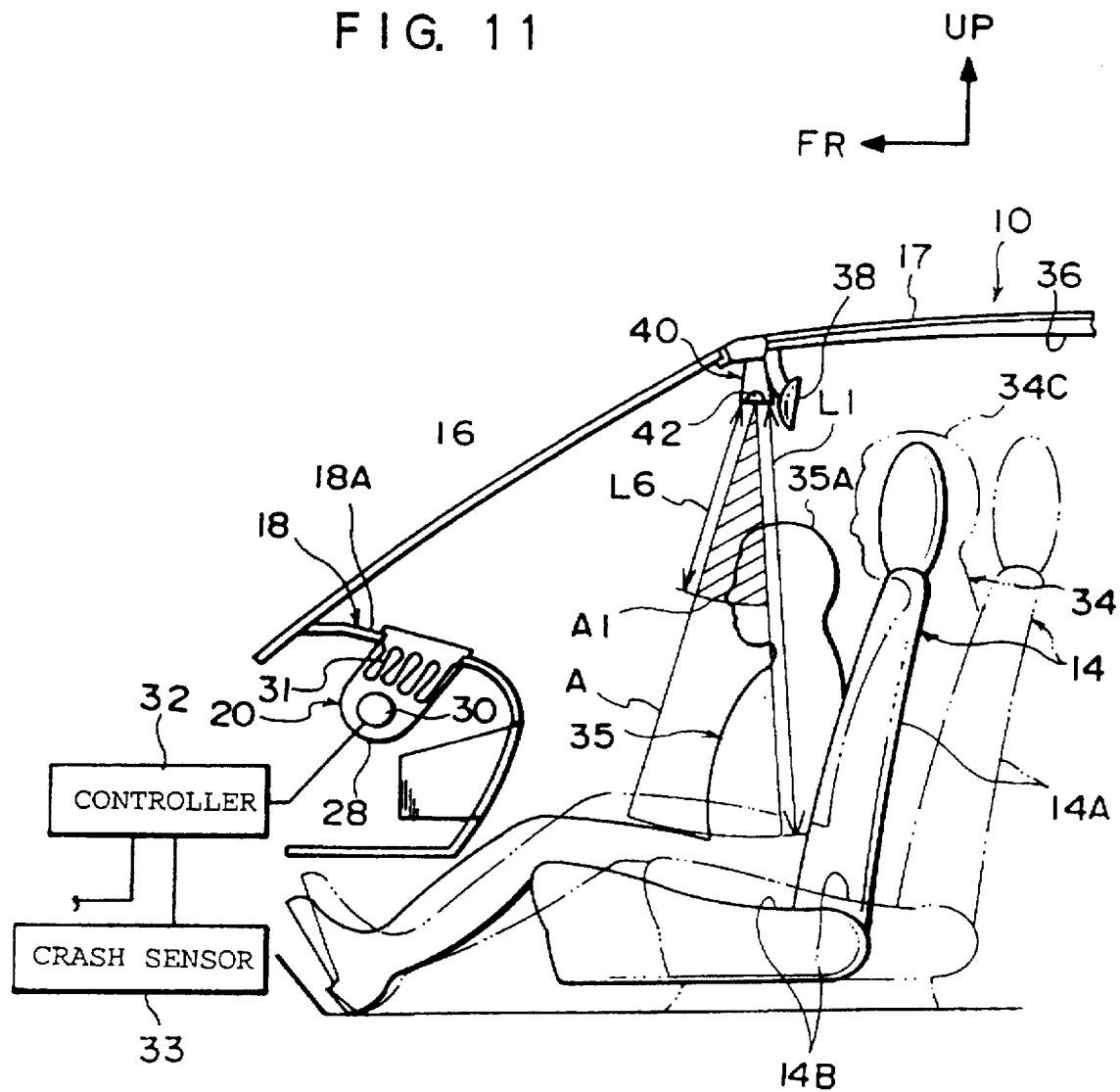
FIG. 11 is a schematic side elevational view illustrating the air bag apparatus for a passenger seat in accordance with a fifth embodiment of the present invention.

As shown in FIG. 11, in the second embodiment, the approach-detecting sensor 44 as the second sensor is not provided, in addition to the distance L1 for determination by the occupant-detecting sensor 42, a distance L6 for determination, which is shorter than the distance L1 for determination, is set.

The detecting region A1 at the distance L6 for determination includes a position for detecting the head 35A of an occupant 35 seated in the passenger seat 14. Namely, the occupant-detecting sensor 42 detects the distance to the seat cushion 14B of the passenger seat 14 which was moved rearwardly as well as the distance to the leg portions 34A of the passenger 34. On the basis of these distances, a determination is made by the air-bag controlling circuit 32 as to whether or not the occupant 34 is seated. At the same time, when the seat 14 is moved a forward-end position, the distance to the head 35A of the occupant 35 seated in the passenger seat 14 air-bag is also detected, and on the basis of the detected distance, the controlling circuit 32 determines whether or not the head 35A of the occupant 35 is excessively close to the air bag apparatus 20.

Next, referring to the flowchart shown in FIG. 12, a description will be given of the operation of the fifth embodiment. Incidentally, the same processing as that of the first embodiment will be denoted by the same step numbers, and a description thereof will be omitted.

Figure 12:
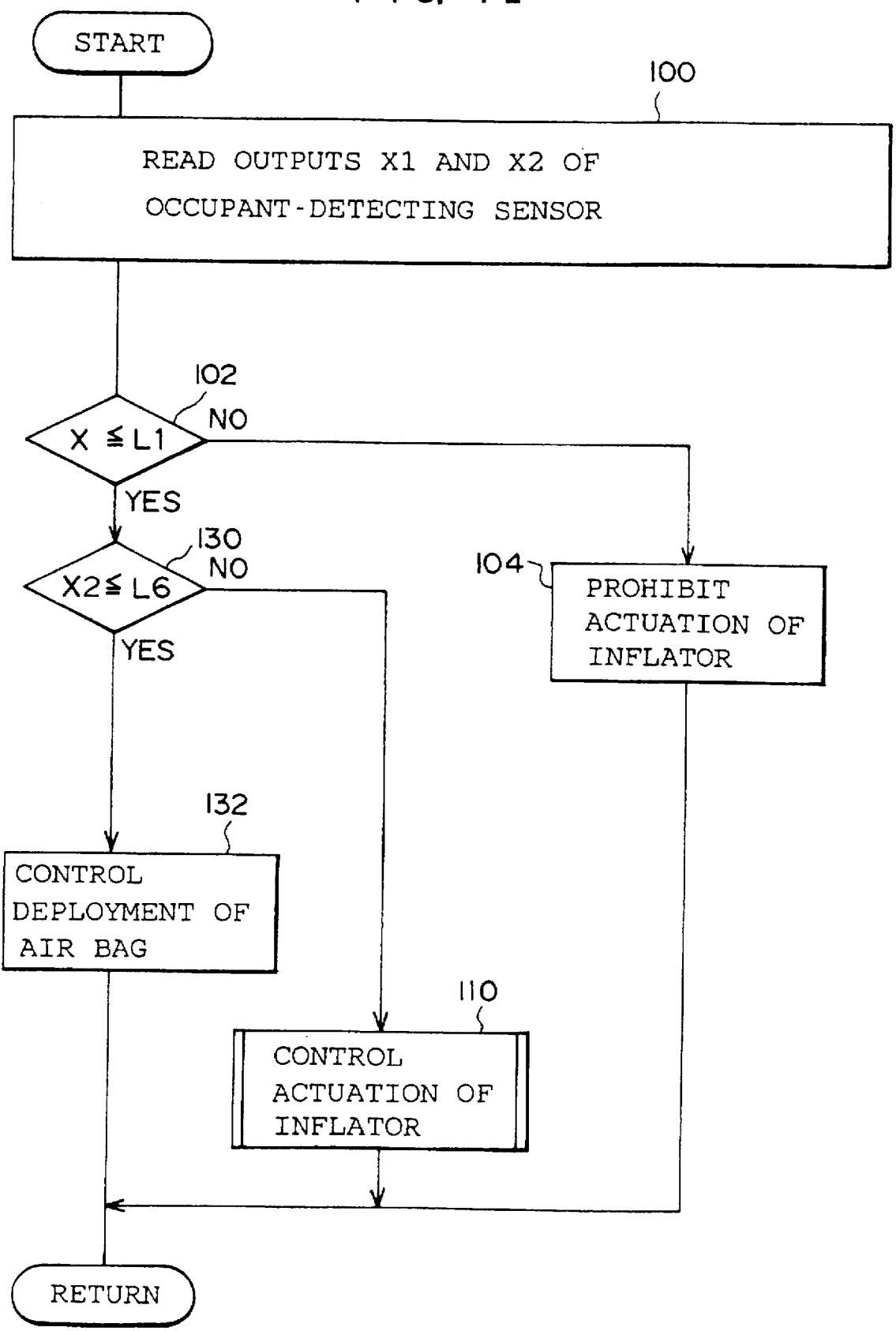
FIG. 12 is a flowchart illustrating occupant detection control in the air bag apparatus for a passenger seat in accordance with the fifth embodiment of the present invention.
Figure 13:
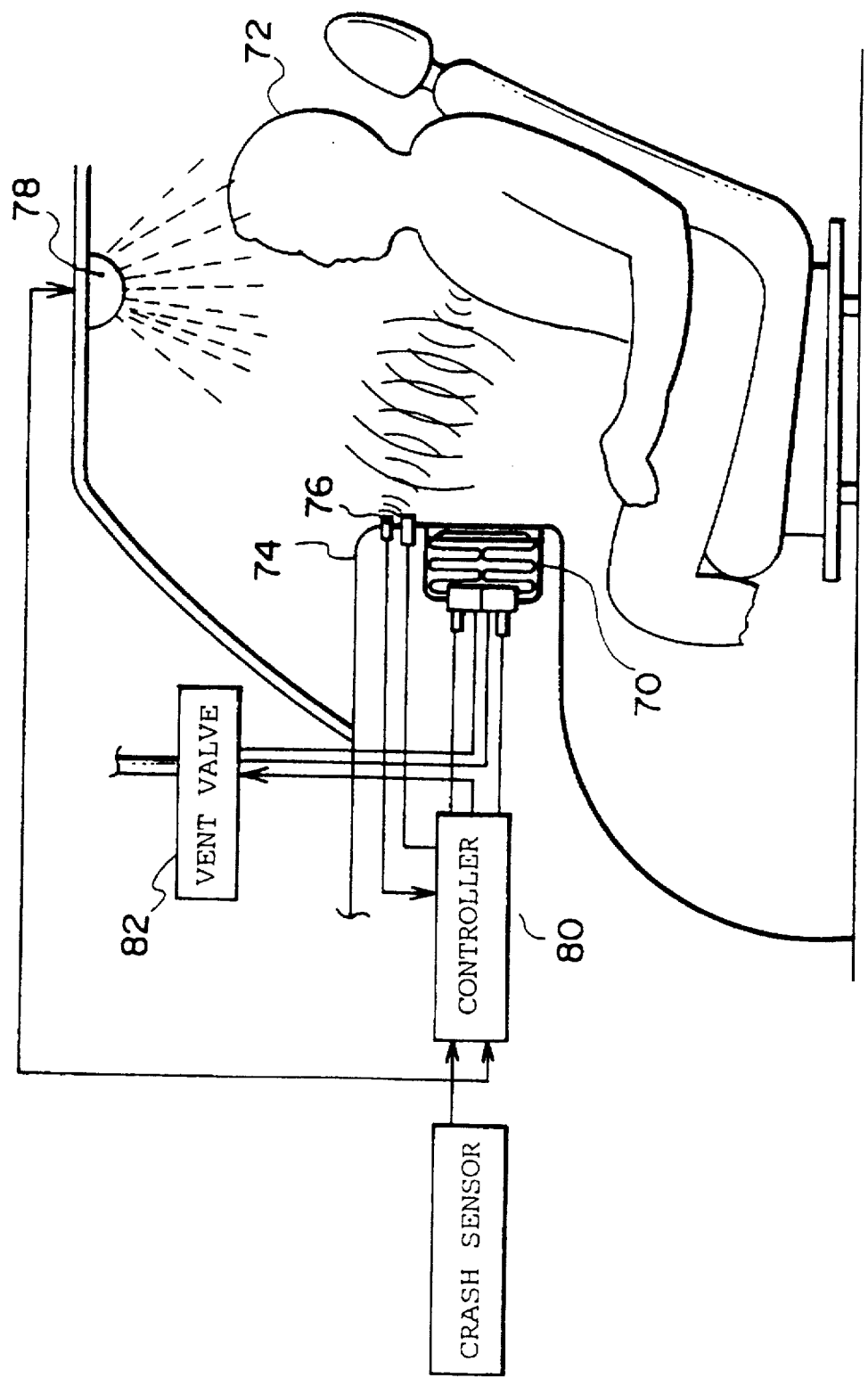
FIG. 13 is a schematic side elevational view illustrating a conventional air bag apparatus for a passenger seat.

As shown in FIG. 12, in Step 100, the air-bag controlling sensor 32 in the fifth embodiment reads outputs X1 and X2 of the occupant-detecting sensor 42. In addition, if it is determined in Step 102 that the detected distance X1 is less than or equal to the distance L1 for determination (i.e., if it is determined that the occupant 34 is seated on the seat cushion 14B of the passenger seat 14), a determination is made in Step 130 as to whether the detected distance X2 is less than or equal to the distance L6 for determination.

If it is determined in Step 130 that the detected distance X2 is not less than or equal to the distance L6 for determination (i.e., if it is determined that there is no object to be detected in the detecting region A1), the operation proceeds to Step 110 to provide control for actuating the inflator 30 under a predetermined condition. For instance, if the crash signal is inputted from the crash sensor 33, the inflator 30 is actuated to deploy the air bag 31.

Meanwhile, if it is determined in Step 130 that the detected distance X2 is less than or equal to the distance L6 for determination (i.e., if the passenger seat 14 has been moved to the forward-end position, and the head 35A of the occupant 35 seated in the passenger seat 14 is located in the detecting region A1), the operation proceeds to Step 132 to provide control for in the deployment of the air bag by lowering the internal pressure of the air bag 31 and delaying the deploying speed. Specifically, as disclosed in Japanese Patent Application Laid-Open No. 293234/1990, two inflators 30 are used, and only one of them is actuated.

Accordingly, in the fifth embodiment, two distances for determination by the occupant-detecting sensor 42 are set, and on the basis of a result of that determination a distinction is made between the case where the passenger seat 14 has been moved to the forward-end position, and the head 35A of the occupant 35 seated in the passenger seat 14 is located in the detecting region A1 and the case where it is not, and the inflator 30 is controlled on the basis of the detected result. Therefore, the air bag 31 can be deployed positively in a condition for which the deployment of the air bag 31 is desired. In addition, it suffices to use only one sensor, so that the configuration can be simplified.

Although in the above-described embodiments an ultrasonic sensor is used as the occupant-detecting sensor for detecting the presence of the occupant seated in the passenger seat 14, as the occupant-detecting sensor it is possible to use instead of the ultrasonic sensor a seating sensor constituted by a buckle switch of a seat belt, a load sensor, a capacitance sensor, or the like. In addition, although in the above-described embodiments an ultrasonic sensor is used as the distance-measuring sensor, it is possible to use instead of the ultrasonic sensor a position sensitive detector (PSD) sensor based on triangulation using a light beam, or a sensor using radio waves, a laser or the like.

What is claimed is:

1. An air bag apparatus for a passenger seat, comprising:
   a first sensor for detecting an occupant seated in a passenger seat;
   a second sensor for detecting a state in which the occupant is approaching an instrument panel excluding a state in which the occupant puts out his or her hand(s) on the instrument panel; and
   a deployment controller for changing the control of deployment of an air bag when the occupant is detected by said first sensor and the state in which the occupant is approaching the instrument panel is detected by said second sensor.

2. An air bag apparatus for a passenger seat according to claim 1, wherein said first sensor is an ultrasonic sensor which is disposed at a portion of a roof of a vehicle in a range of positions between a position above the instrument panel and a position above a seat back of the passenger seat, a detecting region of said first sensor being oriented downward and a lower end of the detecting region being located at a position in the vehicle corresponding to a position of leg portions of the occupant in a seated state.

3. An air bag apparatus for a passenger seat according to claim 2, wherein said second sensor is an ultrasonic sensor which is disposed at the portion of the roof of the vehicle in the range of positions between the position above the instrument panel and the position above the seat back of the passenger seat, a detecting region of said second sensor being oriented toward the instrument panel and a distant end of the detecting region located at a position in the vehicle corresponding to a position spaced apart a predetermined distance upwardly from the instrument panel.

4. An air bag apparatus for a passenger seat according to claim 3, further comprising:
   a third sensor disposed between said first sensor and said second sensor and constituted by an ultrasonic sensor, a detecting region of said third sensor being oriented toward a space between the instrument panel and a seat cushion and a distant end of the detecting region located at a position in the vehicle corresponding to a position below the instrument panel.

5. An air bag apparatus for a passenger seat according to claim 1, wherein said second sensor is an ultrasonic sensor which is disposed at the portion of the roof of the vehicle in the range of positions between the position above the instrument panel and the position above the seat back of the passenger seat, a detecting region of said second sensor being oriented toward the instrument panel and a distant end of the detecting region being located at a position in the vehicle corresponding to a position spaced apart a predetermined distance upwardly from the instrument panel.

6. An air bag apparatus for a passenger seat according to claim 1, further comprising:
   a third sensor disposed between said first sensor and said second sensor and constituted by an ultrasonic sensor, a detecting region of said third sensor being oriented toward a space between the instrument panel and a seat cushion and including a position below the instrument panel.

7. An air bag apparatus for a passenger seat according to claim 6, wherein said third sensor detects the presence or absence of a child seat.

8. An air bag apparatus for a passenger seat according to claim 1, wherein said second sensor is an ultrasonic sensor which is disposed on the instrument panel such that a detecting region of said second sensor is oriented in a rearward direction of the vehicle, a distant end of the detecting region being located at a position in the vehicle which is a position spaced apart a predetermined distance upwardly from the instrument panel.

9. An air bag apparatus for a passenger seat according to claim 1, wherein said second sensor is an ultrasonic sensor which is disposed in the instrument panel such that a detecting region of said second sensor is oriented toward a front windshield and is reflected in a rearward direction of the vehicle by the front windshield, a lower end of the detecting region being spaced apart a predetermined distance upwardly from the instrument panel.

10. An air bag apparatus for a passenger seat according to claim 1, wherein said second sensor is a sensor of an infrared beam interruption type which is disposed between a front pillar and the instrument panel such that a line connecting a transmitting sensor element and a receiving sensor element of said second sensor is located at a position spaced apart a predetermined distance upwardly from the instrument panel, a threshold time of an interruption time being set to less than or equal to several milliseconds.

11. An air bag apparatus for a passenger seat according to claim 11, wherein, on the basis of the detection by said first sensor and said second sensor, said deployment controller determines whether the occupant is seated and determines if the occupant is in the state of putting out his/her hand(s) on the instrument panel or if the occupant is in the state of approaching the instrument panel, and said deployment controller controls the deployment of the air bag main body on the basis of these determinations, and when said deployment controller determines that the occupant is in the state of putting out his/her hand(s) on the instrument panel, said deployment controller permits deployment of the air bag, and when said deployment controller determines that the occupant is in the state of approaching the instrument panel, said deployment controller prohibits deployment of the air bag.

12. An air bag apparatus for a passenger seat, comprising:
a first sensor for detecting an occupant seated in a passenger seat, said first sensor being an ultrasonic sensor which is disposed at a portion of a roof of a vehicle in a range of positions between a position above the instrument panel and a position above a seat back of the passenger seat, a detecting region of said first sensor being oriented downward and a lower end of the detecting region being located near a position of leg portions of the occupant in a seated state;
a second sensor for detecting a state in which the occupant is approaching an instrument panel excluding a state in which the occupant put out his or her hand(s) on the instrument panel; and
a deployment controller for changing the control of deployment of an air bag when the occupant is detected by said first sensor and the state in which the occupant is approaching the instrument panel is detected by said second sensor.

13. An air bag apparatus for a passenger seat according to claim 12, wherein said second sensor is an ultrasonic sensor which is disposed at the portion of the roof of the vehicle in the range of positions between the position above the instrument panel and the position above the seat back of the passenger seat, a detecting region of said second sensor being oriented toward the instrument panel and a distant end of the detecting region being located at a position in the vehicle corresponding to a position spaced apart a predetermined distance upwardly from the instrument panel and there is provided a third sensor disposed between said first sensor and said second sensor and constituted by an ultrasonic sensor, a detecting region of said third sensor being oriented toward a space between the instrument panel and a seat cushion and a distant end of the detecting region being located at a position in the vehicle corresponding to a position below the instrument panel.

14. An air bag apparatus for a passenger seat according to claim 13, wherein said third sensor detects the presence or absence of a child seat.

15. An air bag apparatus for a passenger seat according to claim 12, wherein said second sensor is an ultrasonic sensor which is disposed on the instrument panel such that a detecting region of said second sensor is oriented in a rearward direction of the vehicle, a distant end of the detecting region being located at a position spaced apart a predetermined distance upwardly from the instrument panel.

16. An air bag apparatus for a passenger seat according to claim 12, wherein said second sensor is an ultrasonic sensor which is disposed in the instrument panel such that a detecting region of said second sensor is oriented toward a front windshield and is reflected in a rearward direction of the vehicle by the front windshield, a lower end of the detecting region being spaced apart a predetermined distance upwardly from the instrument panel.

17. An air bag apparatus for a passenger seat according to claim 12, wherein said second sensor is a sensor of an infrared beam interruption type which is disposed between a front pillar and the instrument panel such that a line connecting a transmitting sensor element and a receiving sensor element of said second sensor is located at a position spaced apart a predetermined distance upwardly from the instrument panel, a threshold time of an interruption time being set to less than or equal to several milliseconds.

18. An air bag apparatus for a passenger seat according to claim 12, wherein said second sensor is an ultrasonic sensor which is disposed at the portion of the roof of the vehicle in the range of positions between the position above the instrument panel and the position above the seat back of the passenger seat, a detecting region of said sensor being oriented toward the instrument panel and a distant end of the detecting region being located at a position in the vehicle corresponding to a position spaced apart a predetermined distance upwardly from the instrument panel.

19. An air bag apparatus for a passenger seat according to claim 1, wherein, on the basis of the detection by said first sensor and said second sensor, said deployment controller determines whether the occupant is seated and determines if the occupant is in the state of putting out his/her hand(s) on the instrument panel or if the occupant is in the state of approaching the instrument panel, and said deployment controller controls the deployment of the air bag main body on the basis of these determinations, and when said deployment controller determines that the occupant is in the state of putting out his/her hand(s) on the instrument panel, said deployment controller permits deployment of the air bag, and when said deployment controller determines that the occupant is in the state of approaching the instrument panel, said deployment controller prohibits deployment of the air bag.

20. An air bag apparatus for a passenger seat, comprising:
a first sensor for detecting an occupant seated in a passenger seat and for detecting a position of the head of the occupant; and
a deployment controller for changing the control of deployment of an air bag when the occupant and the position of the head of the occupant are detected by said first sensor,
wherein said first sensor is an ultrasonic sensor which is disposed at a portion of a roof of a vehicle in a range of positions between a position above the instrument panel and a position above the seat back of the passenger seat, said first sensor being provided with two detecting regions oriented downward, one of the two detecting regions extending to a position in the vehicle corresponding to a position of leg portions of the occupant in a seated state, another one thereof extending to a position in the vehicle corresponding to a position of the head of the occupant when the passenger seat is at its frontmost position.

21. An air bag apparatus for a passenger seat, comprising:
a first sensor for detecting an occupant seated in a passenger seat;
a second sensor for detecting a state in which the occupant is approaching an instrument panel excluding a state in which the occupant puts out his or her hand(s) on the instrument panel; and
a deployment controller for changing the control of deployment of an air bag when the occupant is detected by said first sensor and the state in which the occupant is approaching the instrument panel is detected by said second sensor, wherein said second sensor is an ultrasonic sensor which is disposed at a portion of a roof of a vehicle in a range of positions between a position above the instrument panel and a position above the seat back of the passenger seat, a detecting region of said second sensor being oriented toward the instrument panel and a distant end of the detecting region being located at a position in the vehicle corresponding to a position spaced apart a predetermined distance upwardly from the instrument panel.

22. An air bag apparatus for a passenger seat, comprising:

a first sensor that detects whether an occupant is seated in a passenger seat;

a second sensor that detects and differentiates between a first state in which the occupant is approaching an instrument panel and a second state in which the occupant is putting out his or her hand(s) on the instrument panel; and a deployment controller that controls deployment of an air bag when the occupant is detected by said first sensor and in accordance with the first and second states detected by said second sensor.

* * * * *